US012577105B2

(12) United States Patent (10) Patent No.: US 12,577,105 B2
Matsubara (45) Date of Patent: Mar. 17, 2026

(54) LITHIUM NITRIDE MANUFACTURING DEVICE AND METHOD OF MANUFACTURING LITHIUM NITRIDE

(71) Applicant: FURUKAWA CO., LTD., Tokyo (JP)

(72) Inventor: Tetsuya Matsubara, Tsukuba (JP)

(73) Assignee: FURUKAWA CO., LTD., Tokyo (JP)

( * ) Notice: Subject to any disclaimer, the term of this patent is extended or adjusted under 35 U.S.C. 154(b) by 670 days.

(21) Appl. No.: 17/919,119

(22) PCT Filed: Mar. 12, 2021

(86) PCT No.: PCT/JP2021/010158
§ 371 (c)(1),
(2) Date: Oct. 14, 2022

(87) PCT Pub. No.: WO2021/210314
PCT Pub. Date: Oct. 21, 2021

(65) Prior Publication Data
US 2023/0159331 A1 May 25, 2023

(30) Foreign Application Priority Data

Apr. 16, 2020 (JP) ................................ 2020-073635

(51) Int. Cl.
*B01J 15/00* (2006.01)
*B01J 19/00* (2006.01)
(Continued)

(52) U.S. Cl.
CPC ............. *C01B 21/061* (2013.01); *B01J 15/00* (2013.01); *B01J 19/0013* (2013.01); *B01J 19/18* (2013.01); *B01J 2219/00076* (2013.01)

(58) Field of Classification Search
CPC ........ B01J 15/00; B01J 19/0013; B01J 19/18; B01J 19/22; B01J 2219/00076; C01B 21/061; Y02E 60/10
(Continued)

(56) References Cited

U.S. PATENT DOCUMENTS 2,866,685 A 12/1958 Henry et al.
2,910,347 A 10/1959 Esmay
(Continued)

FOREIGN PATENT DOCUMENTS

JP 2001-48504 A 2/2001
JP 2002-3209 A 1/2002
(Continued)

OTHER PUBLICATIONS

International Search Report dated May 11, 2021, issued in counterpart International Application No. PCT/JP2021/010158. (2 pages).
(Continued)

*Primary Examiner* — Rebecca Janssen
*Assistant Examiner* — Mayela Aldaz
(74) *Attorney, Agent, or Firm* — WHDA, LLP

(57) ABSTRACT

Provided is a lithium nitride manufacturing device (10) for heating a lithium member (9) in a nitrogen atmosphere to nitride the lithium member (9) such that lithium nitride is manufactured, the lithium nitride manufacturing device including: a reaction tank (1) where a nitriding reaction of the lithium member (9) is performed; a heating unit (2) that heats the lithium member (9); an atmosphere control unit (3) that controls a dew point in the reaction tank (1); and an atmosphere cooling unit (4) that cools an inside of the reaction tank (1).

19 Claims, 3 Drawing Sheets

(51) Int. Cl.
B01J 19/18 (2006.01)
C01B 21/06 (2006.01)

(58) Field of Classification Search
USPC ........................................................ 266/252
See application file for complete search history.

(56) References Cited

U.S. PATENT DOCUMENTS

| | | | |
|---|---|---|---|
| 11,367,889 B2 | 6/2022 | Desai et al. | |
| 2016/0082469 A1* | 3/2016 | Noda .................. | G03G 9/1075 |
| | | | 118/244 |
| 2019/0044167 A1 | 2/2019 | Desai et al. | |

FOREIGN PATENT DOCUMENTS

| | | | | |
|---|---|---|---|---|
| JP | 2002003209 | A | * | 1/2002 |
| JP | 2014201511 | A | * | 10/2014 |
| JP | 2015-074566 | A | | 4/2015 |
| JP | 2019-26936 | A | | 2/2019 |
| JP | 2021-54697 | A | | 4/2021 |
| WO | 2021/065309 | A1 | | 4/2021 |

OTHER PUBLICATIONS

Extended (Supplementary) European Search Report dated Apr. 3, 2024, issued in counterpart EP application No. 21788956.7. (8 pages).
Office Action dated Sep. 19, 2023, issued in counterpart to CN application No. 202180028117.9. (8 pages).

* cited by examiner

[Fig.1]
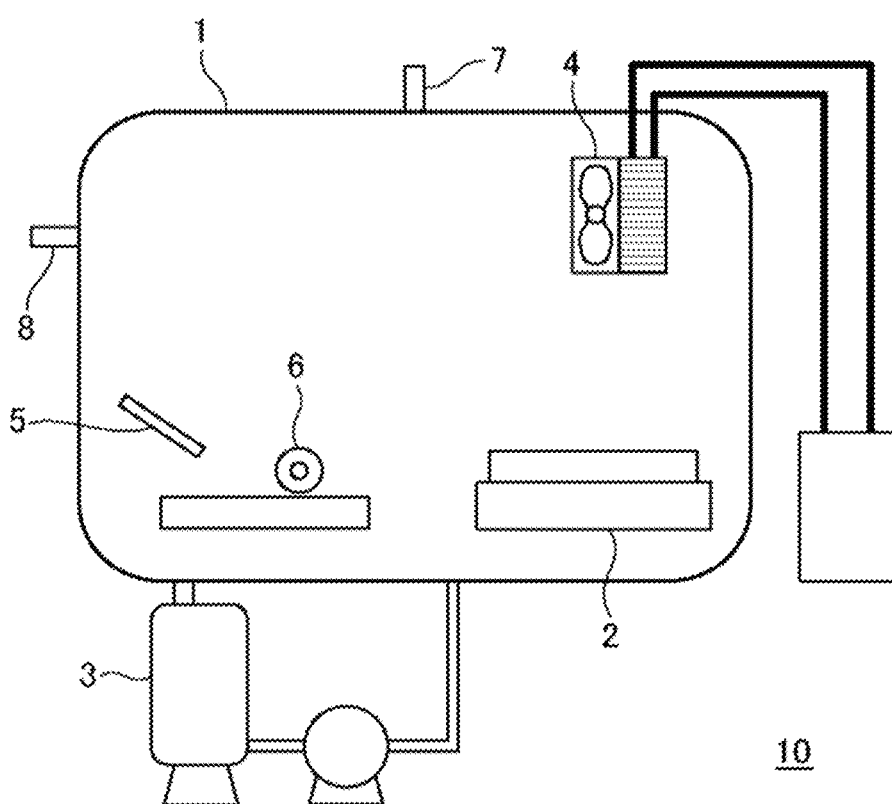

[Fig.2]
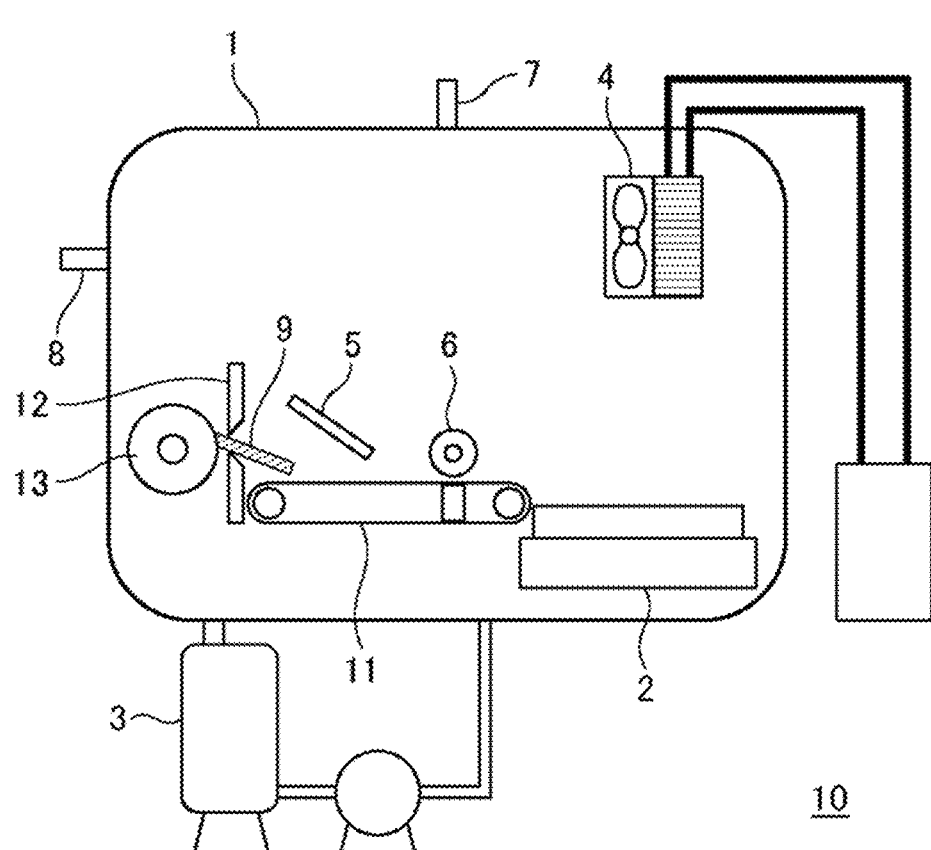

[Fig.3]
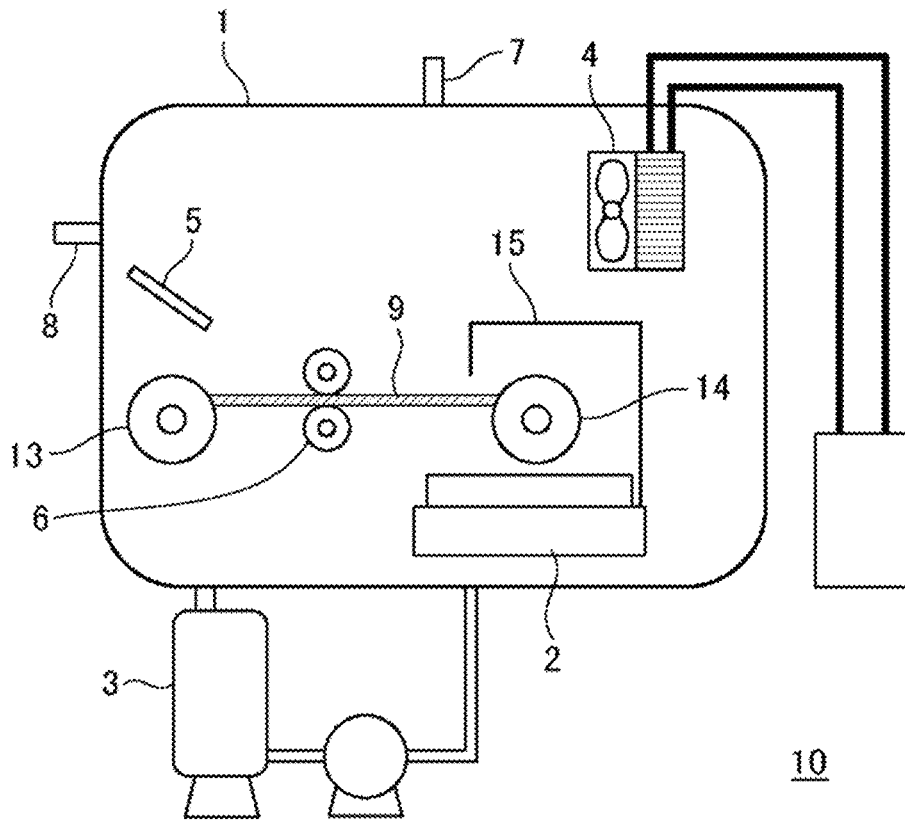
10

LITHIUM NITRIDE MANUFACTURING DEVICE AND METHOD OF MANUFACTURING LITHIUM NITRIDE

TECHNICAL FIELD

The present invention relates to a lithium nitride manufacturing device and a method of manufacturing lithium nitride.

BACKGROUND ART

Lithium nitride is known as a high ion conductor having a lithium ionic conductivity of $10^{-3}$ $Scm^{-1}$ at room temperature, and the application thereof to, for example, a solid electrolyte or an electrode material for a lithium ion battery is considered.

Lithium nitride is easily decomposed when coming into contact with water. Therefore, there are many restrictions on a synthesis method of lithium nitride, and typically lithium nitride is manufactured by reaction of metallic lithium and nitrogen gas.

Patent Document 1 (Japanese Unexamined Patent Publication No. 2001-48504) discloses a method of manufacturing lithium nitride in which metallic lithium and nitrogen are caused to react with each other while maintaining temperatures of lithium and lithium nitride to be formed at a melting temperature of lithium or lower by cooling in a nitrogen gas atmosphere.

In addition, Patent Document 2 (Japanese Unexamined Patent Publication No. 2002-3209) discloses a method of manufacturing lithium nitride including a step of heating metallic lithium to 50° C. to 110° C. in a nitrogen atmosphere at a temperature increase rate of 0.4° C./min to 7.0° C./min.

RELATED DOCUMENT

Patent Document

[Patent Document 1] Japanese Unexamined Patent Publication No. 2001-48504

[Patent Document 2] Japanese Unexamined Patent Publication No. 2002-3209

SUMMARY OF THE INVENTION

Technical Problem

However, according to an investigation by the present inventors, it was clarified that, with the method of manufacturing lithium nitride by reaction of metallic lithium and nitrogen gas as disclosed in Patent Documents 1 and 2, the reaction of metallic lithium and nitrogen gas does not occur with high reproducibility and there may be a case where a nitriding reaction does not progress.

The present invention has been made under these circumstances, and an object thereof is to provide a lithium nitride manufacturing device and a method of manufacturing lithium nitride in which the formation of lithium nitride progresses rapidly such that lithium nitride can be stably formed.

Solution to Problem

According to the present invention,
there is provided a lithium nitride manufacturing device for heating a lithium member in a nitrogen atmosphere to nitride the lithium member such that lithium nitride is manufactured, the lithium nitride manufacturing device including:

a reaction tank where a nitriding reaction of the lithium member is performed;

a heating unit that heats the lithium member;

an atmosphere control unit that controls a dew point in the reaction tank; and an atmosphere cooling unit that cools an inside of the reaction tank.

In addition, according to the present invention,
there is provided a method of manufacturing lithium nitride, the method including:

a step (A) of disposing a lithium member in the reaction tank of the above-described lithium nitride manufacturing device; and a step (B) of nitriding the lithium member by making the inside of the reaction tank to be in a nitrogen atmosphere and heating the lithium member using the heating unit while controlling a dew point and a temperature in the reaction tank using the atmosphere control unit and the atmosphere cooling unit.

Advantageous Effects of Invention

According to the present invention, it is possible to provide a lithium nitride manufacturing device and a method of manufacturing lithium nitride in which the formation of lithium nitride progresses rapidly such that lithium nitride can be stably formed.

BRIEF DESCRIPTION OF THE DRAWINGS

FIG. 1 is a cross-sectional view schematically showing an example of a structure of a lithium nitride manufacturing device according to a first embodiment of the present invention.

FIG. 2 is a cross-sectional view schematically showing an example of a structure of a lithium nitride manufacturing device according to a second embodiment of the present invention.

FIG. 3 is a cross-sectional view schematically showing an example of a structure of a lithium nitride manufacturing device according to a third embodiment of the present invention.

DESCRIPTION OF EMBODIMENTS

Hereinafter, an embodiment of the present invention will be described using the drawings. In all the drawings, the same components are represented by common reference numerals, and the description thereof will not be repeated. In addition, the diagrams are schematic diagrams, in which a dimensional ratio does not match the actual one. In addition, unless specified otherwise, a numerical range "A to B" represents A or more and B or less.

Lithium Nitride Manufacturing Device

FIGS. 1 to 3 are cross-sectional views schematically showing an example of a structure of a lithium nitride manufacturing device 10 according to an embodiment of the present invention.

The lithium nitride manufacturing device 10 according to the present embodiment is a lithium nitride manufacturing device 10 for heating a lithium member 9 in a nitrogen atmosphere to nitride the lithium member 9 such that lithium nitride is manufacturing, the lithium nitride manufacturing device including: a reaction tank 1 where a nitriding reaction of the lithium member 9 is performed; a heating unit 2 that is disposed in the reaction tank 1 and heats the lithium member 9; an atmosphere control unit 3 that controls a dew point in the reaction tank 1; and an atmosphere cooling unit 4 that cools the inside of the reaction tank 1.

With the lithium nitride manufacturing device 10 according to the present embodiment, the formation of lithium nitride progresses rapidly such that lithium nitride can be stably formed.

As described above, according to an investigation by the present inventors, it was clarified that, with the method of manufacturing lithium nitride by reaction of metallic lithium and nitrogen gas as disclosed in Patent Documents 1 and 2, the reaction of metallic lithium and nitrogen gas does not occur with high reproducibility and there may be a case where a nitriding reaction does not progress.

Therefore, as a result of a thorough investigation by the present inventors, it was found that the nitriding reaction of the lithium member progresses rapidly by heating the lithium member 9 in a nitrogen atmosphere using the heating unit 2 while controlling a dew point in the reaction tank 1 using the atmosphere control unit 3 controlling the dew point in the reaction tank 1 and the atmosphere cooling unit 4 cooling the inside of the reaction tank 1.

It is considered that, by controlling the dew point in the reaction tank 1, the formation of a film including lithium oxide or lithium hydroxide on the metallic lithium surface can be suppressed. Therefore, it is considered that the contact area between metallic lithium and nitrogen increases such that the nitriding reaction of the lithium member progresses rapidly.

The reaction tank 1 is not particularly limited as long as the nitriding reaction of the lithium member 9 can be performed and the dew point, the nitrogen atmosphere, and the atmosphere temperature (the temperature in the reaction tank 1) can be maintained. Examples of the reaction tank 1 include a reaction tank formed of a heat-resistant material, a glovebox, a desiccator, a vacuum replace-type desiccator, and a metal sealed can.

In addition, the shape or size of the reaction tank 1 is not particularly limited and is appropriately determined depending on the throughput of the lithium member 9.

The heating unit 2 is not particularly limited. For example, a well-known heating unit such as a heating wire, lamp heating, high frequency induction heating, or microwave heating can be used. As described below it is preferable that the heating unit 2 includes a local heating unit that is capable of locally heating the lithium member 9.

Examples of the atmosphere control unit 3 that controls a dew point in the reaction tank 1 include a column filled with a water adsorbent such as molecular sieve, a trap through which a coolant is circulated, a honeycomb to which a water-absorbing material such as LiCl is applied, and a column filled with diphosphorus pentoxide.

By circulating nitrogen gas in the reaction tank 1 through the atmosphere control unit 3, water in the nitrogen gas can be removed to control the dew point in the reaction tank 1.

Examples of the atmosphere cooling unit 4 that cools the inside of the reaction tank 1 include a heat exchanger connected to an air cooling type solvent circulation device and a heat exchanger connected to a coolant type solvent circulation device.

In addition, as shown in FIG. 1, optionally, the lithium nitride manufacturing device 10 according to the present embodiment may further include: a powder supply unit 5 that supplies inorganic particles to a surface of the lithium member 9; and a rolling unit 6 that embeds the inorganic particles attached to the surface of the lithium member 9 in the lithium member 9.

As a result, in the lithium nitride manufacturing device 10, the lithium member 9 in which the inorganic particles described below are embedded can be prepared, and the nitriding reaction in the lithium nitride manufacturing device 10 can be made to progress without the obtained lithium member 9 in which the inorganic particles are embedded being exposed to the atmosphere.

Examples of the powder supply unit 5 include a vibration feeder, a table feeder, and a screw feeder.

In addition, optionally, as shown in FIG. 1, the lithium nitride manufacturing device 10 according to the present embodiment may further include a gas supply unit 7 that introduces nitrogen gas into the reaction tank 1. As a result, the reaction tank 1 is filled with fresh nitrogen gas such that the nitriding reaction of the lithium member 9 can progress more rapidly. Further, the pressure in the reaction tank 1 is negative, and the atmosphere can be prevented from flowing into the reaction tank 1.

In addition, optionally, as shown in FIG. 1, the lithium nitride manufacturing device 10 according to the present embodiment may further include a gas discharge unit 8 that discharges nitrogen gas in the reaction tank 1. As a result, the pressure in the reaction tank 1 increases such that application of a load to the reaction tank 1 can be suppressed.

In addition, the positions of the gas supply unit 7 and the gas discharge unit 8 in the reaction tank 1 are not particularly limited.

In addition, as shown in FIG. 2, the lithium nitride manufacturing device 10 according to the present embodiment may be configured to further include at least one selected from a transport unit 11, a cutting unit 12, and a lithium member roll 13.

As a result, the lithium member 9 transported from the lithium member roll 13 can be cut into an appropriate size by the cutting unit 12, and the cut lithium member 9 can be transported to the heating unit 2 by the transport unit 11. In addition, in the middle of the transport unit 11, the inorganic particles can be supplied to a surface of the lithium member 9 using the powder supply unit 5, and subsequently the inorganic particles can be embedded in the lithium member 9 using the rolling unit 6. As a result, a step of preparing the lithium member 9 in which inorganic particles are embedded; and a step of heating the lithium member 9 in which inorganic particles are embedded can be continuously performed.

Examples of the transport unit 11 include a belt conveyor.

In addition, as shown in FIG. 3, the lithium nitride manufacturing device 10 according to the present embodiment may further include: the lithium member roll 13 and a lithium nitride roll 14. As a result, the lithium member 9 transported from the lithium member roll 13 can be transported to the lithium nitride roll 14 disposed in the heating unit 2. Next, while transporting the lithium member 9 from the lithium member roll 13 to the lithium nitride roll 14, the inorganic particles can be supplied to the surface of the lithium member 9 using the powder supply unit 5, and subsequently the inorganic particles can be continuously embedded in the lithium member 9 using the rolling unit 6. As a result, the step of preparing the lithium member 9 in which inorganic particles are embedded; and the step of heating the lithium member 9 in which inorganic particles are embedded can be continuously performed.

In addition, as shown in FIG. 3, the lithium nitride manufacturing device 10 according to the present embodiment may further include a cover 15 for heat accumulation that covers the vicinity of the heating unit 2.

As a result, even when a temperature at which the lithium member 9 disposed in the reaction tank 1 is heated increases, an increase in the atmosphere temperature of the reaction tank 1 can be suppressed, and thus an increase the dew point in the reaction tank 1 can be suppressed.

Method of Manufacturing Lithium Nitride

Next, a method of manufacturing lithium nitride according to the present embodiment will be described.

The method of manufacturing lithium nitride according to the present embodiment is a method of manufacturing lithium nitride, and includes, for example, steps (A) and (B) described below. In addition, the method of manufacturing lithium nitride according to the present embodiment may optionally further include steps (C) and (D) described below.

Step (A): a step of disposing the lithium member 9 in the reaction tank 1 of the lithium nitride manufacturing device 10 according to the present embodiment Step (B): a step of nitriding the lithium member 9 by making the inside of the reaction tank 1 to be in a nitrogen atmosphere and heating the lithium member 9 using the heating unit 2 while controlling a dew point and a temperature in the reaction tank 1 using the atmosphere control unit 3 and the atmosphere cooling unit 4

Step (C): a step of embedding the inorganic particles in the lithium member 9 before the step (B)

Step (D): a step of crushing the nitrided lithium member 9 into powder after the step (B)

Step (A)

In the step (A), the lithium member 9 is disposed in the reaction tank 1 of the lithium nitride manufacturing device 10 according to the present embodiment.

Example of the lithium member 9 according to the present embodiment is metallic lithium having a surface on which a thin film including carbon and oxygen as components is present, and the shape thereof does not need to be special as long as it is a generally provided shape such as an ingot, foil, a wire, or a rod. In this case, in order to rapidly complete the nitriding reaction, a shape having a large surface area is preferable. Therefore, foil is preferable as the shape of the lithium member 9. That is, it is preferable that the lithium member 9 according to the present embodiment is metallic lithium foil.

The thickness of the metallic lithium foil is preferably 3 mm or less and more preferably 1 mm or less. When the thickness of the metallic lithium foil is the upper limit value or less, an explosive reaction caused by accumulation of reaction heat can be suppressed. The thickness of the metallic lithium foil is not particularly limited and may be, for example, 0.05 mm or more and 0.1 mm or more.

Step (B)

In the step (B), the lithium member 9 is nitrided by making the inside of the reaction tank 1 to be in a nitrogen atmosphere and heating the lithium member 9 using the heating unit 2 while controlling a dew point and a temperature in the reaction tank using the atmosphere control unit 3 and the atmosphere cooling unit 4.

From the viewpoint of making the nitriding reaction of the lithium member 9 to progress more rapidly, the dew point in the reaction tank in the step (B) is preferably lower than 0° C., more preferably lower than −10° C., still more preferably lower than −15° C., still more preferably lower than −18° C., still more preferably lower than −20° C., still more preferably lower than −25° C., still more preferably lower than −30° C., still more preferably lower than −40° C., and still more preferably lower than −50° C. The lower limit value of the dew point is not particularly limited and is, for example, −90° C. or higher.

In the method of manufacturing lithium nitride according to the present embodiment, the formation of a film including lithium oxide or lithium hydroxide on the metallic lithium surface can be suppressed by heating the lithium member 9 in a nitrogen atmosphere where the dew point is lower than the upper limit value. Therefore, the contact area between metallic lithium and nitrogen increases such that the nitriding reaction of the lithium member 9 can be made to progress more rapidly.

Nitrogen gas is used for the nitriding reaction of the lithium member 9. The nitrogen gas is easily reactive with lithium and is inexpensive and toxic-free.

It is preferable that the oxygen concentration in the nitrogen gas is as low as possible. The reason for this is that, when the oxygen concentration in the nitrogen gas is high, metallic lithium is significantly oxidized and corroded, the formation of lithium nitride is inhibited, and lithium oxide or lithium hydroxide is incorporated into lithium nitride.

Specifically, the oxygen concentration in the nitrogen gas is preferably 100 ppm or less and more preferably 60 ppm or less.

In addition, the purity of the nitrogen gas is preferably 99.99% or higher.

In the step (B), it is preferable that the lithium member 9 is heated using a local heating unit capable of locally heating the lithium member 9. That is, it is preferable that the heating unit 2 includes a local heating unit that is capable of locally heating the lithium member 9.

It is preferable that the lithium member 9 disposed in the reaction tank 1 or the lithium member 9 and the periphery thereof are locally heated using the local heating unit instead of heating the entirety of the reaction tank 1. As a result, an increase in the temperature in the reaction tank 1 is suppressed. Therefore, an increase in the dew point in the reaction tank 1 caused when a water adsorbent such as a molecular sieve in the atmosphere control unit 3 or water attached to a device, an instrument, or the like is evaporated can be suppressed. That is, by using the local heating unit capable of locally heating the lithium member 9, the lithium member 9 can be heated while maintaining the dew point in the reaction tank 1 to be lower than the upper limit value.

Examples of the local heating unit include conductive heat transfer heating and radiant heat transfer heating. These heating units may be used alone or in combination of two or more types.

The conductive heat transfer heating is a method of bringing the lithium member into contact with a high temperature body to heat the lithium member by heat transfer, and examples of a device for performing conductive heat transfer heating include a hot plate type heater, and a heating roll.

The radiant heat transfer heating is a method of heating the lithium member by making the lithium member to absorb energy radiating from a high temperature body as electromagnetic waves, and examples of a device for performing radiant heat transfer heating include an infrared heater and an infrared lamp.

In the method of manufacturing lithium nitride according to the present embodiment, from the viewpoint of making the formation of the lithium nitride to progress more rapidly, the heating temperature of the heating unit 2 in the step (B) is preferably 30° C. or higher, more preferably 40° C. or higher, and still more preferably 45° C. or higher. The upper limit of the heating temperature of the heating unit 2 is not particularly limited and, from the viewpoint of suppressing an explosive reaction caused by accumulation of reaction heat, is preferably 120° C. or lower, more preferably 100° C. or lower, still more preferably 80° C. or lower, and still more preferably 60° C. or lower.

Here, the heating temperature of the heating unit 2 refers to a preset temperature of the heating unit 2, that is, a temperature of the heating portion.

In the method of manufacturing lithium nitride according to the present embodiment, from the viewpoint of making the formation of the lithium nitride to progress more rapidly, the real temperature of the lithium member 9 in the step (B) is preferably 30° C. or higher, more preferably 40° C. or higher, and still more preferably 50° C. or higher. The upper limit of the real temperature of the lithium member 9 in the step (B) is not particularly limited and, from the viewpoint of suppressing an explosive reaction caused by accumulation of reaction heat, is preferably 120° C. or lower, more preferably 100° C. or lower, and still more preferably 80° C. or lower.

Here, the real temperature of the lithium member 9 in the step (B) refers to the temperature of the surface of the lithium member 9.

In the method of manufacturing lithium nitride according to the present embodiment, from the viewpoint of making the formation of the lithium nitride to progress more rapidly, the atmosphere temperature of the nitrogen atmosphere in the step (B) is preferably 20° C. or higher, more preferably 23° C. or higher, still more preferably 25° C. or higher, and still more preferably 28° C. or higher. The upper limit of the atmosphere temperature of the nitrogen atmosphere in the step (B) is not particularly limited and, from the viewpoint of maintaining the dew point of the nitrogen atmosphere in the step (B) to be lower than the upper limit value, is preferably 40° C. or lower, more preferably 35° C. or lower, and still more preferably 30° C. or lower.

Here, the atmosphere temperature of the nitrogen atmosphere in the step (B) refers to a temperature of a space at a distance of 30 cm from the heating portion of the heating unit 2.

In the method of manufacturing lithium nitride according to the present embodiment, from the viewpoint of maintaining the dew point in the reaction tank 1 in the step (B) to be lower than the upper limit value, the atmosphere temperature in the reaction tank 1 is controlled using the atmosphere cooling unit 4 such as a heat exchanger. As a result, even when the temperature at which the lithium member 9 disposed in the reaction tank 1 is heated increases, an increase in the atmosphere temperature in the reaction tank 1 in the step (B) can be suppressed, and thus the dew point in the reaction tank 1 in the step (B) can be effectively maintained to be lower than the upper limit value.

The time for which the nitriding reaction of the lithium member 9 progresses is, for example, 0.5 hours or longer and 24 hours or shorter, preferably 0.5 hours or longer and 8 hours or shorter, and more preferably 1 hour or longer and 5 hours or shorter.

Step (C)

In the method of manufacturing lithium nitride according to the present embodiment, optionally, the step of embedding the inorganic particles in the lithium member 9 may be performed before the step (B). That is, in the step (B), the lithium member 9 in which the inorganic particles are embedded may be used.

By embedding the inorganic particles in the lithium member 9, the lithium member 9 is deformed such that fresh metallic lithium is exposed from the periphery of a contact portion between the lithium member 9 and the inorganic particles. When nitrogen comes into contact with the fresh metallic lithium, the exposed fresh metallic lithium functions as a nitriding origin such that the nitriding reaction of the lithium member can be made to progress rapidly.

The inorganic particles according to the present embodiment are not particularly limited. For example, lithium nitride powder, lithium sulfide powder, phosphorus sulfide powder, or solid electrolyte powder can be used. From the viewpoint of obtaining lithium nitride having a high purity or the viewpoint of simplifying a step of removing the inorganic particles, lithium nitride powder is preferable as the inorganic particles.

The inorganic particles according to the present embodiment are not particularly limited, and an average particle size $d_{50}$ in a weight average particle size distribution measured using a laser diffraction scattering particle size distribution method is preferably 0.1 μm or more and 45 μm or less, and more preferably 0.5 μm or more and 20 μm or less.

By setting the average particle size $d_{50}$ of the inorganic particles to be the lower limit value or more, the handling properties of the inorganic particles can be improved. In addition, by setting the average particle size $d_{50}$ of the inorganic particles to be the upper limit value or less, the amount of a nitriding origin region formed can be increased, and thus the nitriding reaction of the lithium member can be made to progress more rapidly.

In the lithium member 9 in which the inorganic particles are embedded, when a total amount of the inorganic particles and the lithium member 9 is represented by 100 mass %, the amount of the inorganic particles embedded is preferably 0.1 mass % or more and more preferably 0.5 mass % or more and is preferably 10 mass % or less and more preferably 5 mass % or less.

When the amount of the inorganic particles embedded is the lower limit value or more, the amount of a nitriding origin region formed can be increased, and thus the nitriding reaction of the lithium member can be made to progress more rapidly.

In addition, when the amount of the inorganic particles embedded is the upper limit value or less, an explosive reaction caused by accumulation of reaction heat can be suppressed, and thus the nitriding reaction of the lithium member 9 can be made to progress more safely.

Examples of a method of embedding the inorganic particles in a partial region of the lithium member 9 include a method including: sprinkle the inorganic particles on the surface of the lithium member; and pressing the lithium member 9 to which the inorganic particles are attached using the rolling unit 6.

Examples of the rolling unit 6 include a hand roller, a roll press machine, and a flat press machine. Among these, a roll press machine is preferable. The roll press machine can perform pressing continuously at a constant pressing pressure by setting a roll interval and is suitable for mass production, which is preferable. Examples of a material of the rolling unit 6 include polyacetal.

Step (D)

Optionally, the nitrided lithium member 9 is crushed into powder after the step (B). As a result, the powdery lithium nitride can be obtained. A method of crushing the nitrided lithium member into powder is not particularly limited, and the lithium member can be crushed using a generally well-known crushing unit. The step (D) may be performed in the reaction tank 1 after providing a crushing unit in the reaction tank 1, or maybe performed outside the reaction tank 1 after providing a crushing unit outside the reaction tank 1.

The lithium nitride obtained using the manufacturing method according to the present embodiment can be suitably used for, for example, a solid electrolyte for a lithium ion battery, an electrode material for a lithium ion battery, or an intermediate raw material for a chemical agent. The lithium nitride obtained using the manufacturing method according to the present embodiment has a high purity, and thus can be suitably used as a raw material of a solid electrolyte for a lithium ion battery or an electrode material for a lithium ion battery for which particularly high purity is required.

Hereinabove, the embodiment of the present invention has been described. However, the embodiment is merely an example of the present invention, and various configurations other than the above-described configurations can also be adopted.

EXAMPLES

Hereinafter, the present invention will be described in more detail using Examples and Comparative Examples. However, the present invention is not limited to these Examples and Comparative Examples.

Example 1

A hot plate heated to 50° C. was set in a vacuum replacement-type stainless glovebox in a nitrogen atmosphere (dew point: −30° C., temperature: 25° C.), a metallic lithium foil (manufactured by Honjo Metal Co., Ltd., 60 mm×250 mm×1 mm) having a purity of 99.7% was further disposed on the heated hot plate, and the nitriding reaction of the metallic lithium foil started. Here, the internal temperature of the glovebox was controlled to an ambient temperature (25° C.) using a heat exchanger connected to an air cooling type solvent circulation device. In addition, by circulating the nitrogen gas in the glovebox through a column of a water adsorbent ((manufactured by Wako Pure Chemical Industries, Ltd., molecular sieves 3A), water in the nitrogen gas was removed, and the dew point in the glovebox was maintained at −30° C. In addition, the internal pressure of the nitrogen gas in the glovebox was automatically controlled by a pressure switch, and when the nitrogen gas was consumed by a nitriding reaction with the metallic lithium foil such that the internal pressure decreased, nitrogen gas corresponding to the amount of nitrogen gas consumed was set to be introduced into the glovebox.

Next, a nitriding ratio was calculated from a change in the weight of the metallic lithium. foil. As a result, a nitriding ratio 2 hours after disposing the metallic lithium foil on the hot plate was 83%.

Here, the nitriding ratio of 100% represents that all of the metallic lithium foil (Li) was transformed into lithium nitride ($Li_3N$).

Example 2

The nitriding reaction of the metallic lithium foil was performed using the same method as that of Example 1, except that the dew point of the nitrogen atmosphere was changed to −20° C. A nitriding ratio 5 hours after disposing the metallic lithium foil on the hot plate was 80%.

Example 3

The nitriding reaction of the metallic lithium foil was performed using the same method as that of Example 1, except that the dew point of the nitrogen atmosphere was changed to −50° C. A nitriding ratio 2 hours after disposing the metallic lithium foil on the hot plate was 90%.

Example 4

80 mg of lithium nitride powder was sprinkled on both surfaces of metallic lithium foil (manufactured by Honjo Metal Co., Ltd., 60 mm×250 mm×1 mm, 8 g) having a purity of 99.7%. Next, using a hand roller, the lithium nitride powder attached to the metallic lithium foil was embedded in the surface layer of the metallic lithium foil.

Next, a hot plate heated to 50° C. was set in vacuum replacement-type stainless glovebox in a nitrogen atmosphere (dew point: −30° C., temperature: 25° C.) , the metallic lithium foil having the surface layer in which the lithium nitride powder was embedded was disposed on the heated hot plate, and the nitriding reaction of the metallic lithium foil started. Here, the internal temperature of the glovebox was controlled to an ambient temperature (25° C.) using a heat exchanger connected to an air cooling type solvent circulation device. In addition, by circulating the nitrogen gas in the glovebox through a column of a water adsorbent ((manufactured by Wako Pure Chemical Industries, Ltd., molecular sieves 3A), water in the nitrogen gas was removed, and the dew point in the glovebox was maintained at −30° C. In addition, the internal pressure of the nitrogen gas in the glovebox was automatically controlled by a pressure switch, and when the nitrogen gas was consumed by a nitriding reaction with the metallic lithium foil such that the internal pressure decreased, nitrogen gas corresponding to the amount of nitrogen gas consumed was set to be introduced into the glovebox.

Next, a nitriding ratio was calculated from a change in the weight of the metallic lithium foil. As a result, a nitriding ratio 1 hour after disposing the metallic lithium foil on the hot plate was 81%, and a nitriding ratio 2 hours after disposing the metallic lithium foil on the hot plate was 100%.

Comparative Example 1

The nitriding reaction of the metallic lithium foil was performed using the same method as that of Example 1, except that the metallic lithium foil was not heated (that is, the hot plate was not used). A nitriding ratio 96 hours after disposing the metallic lithium foil in the glovebox was 0%.

Comparative Example 2

The nitriding reaction of the metallic lithium foil was performed using the same method as that of Example 1, except that a heat exchanger connected to an air cooling type solvent circulation device was not used. A nitriding ratio 2 hours after disposing the metallic lithium foil on the hot plate was 10%.

Comparative Example 3

The nitriding reaction of the metallic lithium foil was performed using the same method as that of Example 1, except that the operation of removing water in the nitrogen gas to adjust the dew point in the glovebox by circulating the nitrogen gas in the glovebox through a column of a water adsorbent ((manufactured by Wako Pure Chemical Industries, Ltd., molecular sieves 3A) was not performed. A nitriding ratio 2 hours after disposing the metallic lithium foil on the hot plate was 5%.

The present application claims priority based on Japanese Patent Application No. 2020-073635 filed on Apr. 16, 2020, the entire content of which is incorporated herein by reference.

REFERENCE SIGNS LIST

1: reaction tank
2: heating unit
3: atmosphere control unit
4: atmosphere cooling unit
5: powder supply unit
6: rolling unit
7: gas supply unit
8: gas discharge unit
9: lithium member
10: lithium nitride manufacturing device
11: transport unit
12: cutting unit
13: lithium member roll
14: lithium nitride roll
15: cover for heat accumulation

The invention claimed is:

1. A lithium nitride manufacturing device for heating a lithium member in a nitrogen atmosphere to nitride the lithium member such that lithium nitride is manufactured, the lithium nitride manufacturing device comprising:
   a powder supply unit that supplies inorganic particles to a surface of the lithium member;
   a rolling unit that embeds the inorganic particles attached to the surface of the lithium member in the lithium member;
   a reaction tank where a nitriding reaction of the lithium member is performed;
   a heating unit that heats the lithium member;
   an atmosphere control unit that controls a dew point in the reaction tank; and
   an atmosphere cooling unit that cools an inside of the reaction tank.

2. The lithium nitride manufacturing device according to claim 1, further comprising: a gas supply unit that introduces nitrogen gas into the reaction tank.

3. The lithium nitride manufacturing device according to claim 1, further comprising: a gas discharge unit that discharges nitrogen gas from the reaction tank.

4. The lithium nitride manufacturing device according to claim 1, wherein the heating unit includes a local heating unit that is capable of locally heating an entirety of the lithium member disposed in the reaction tank or the entirety of the lithium member and a periphery thereof.

5. The lithium nitride manufacturing device according to claim 4, wherein the local heating unit includes at least one heating unit selected from conductive heat transfer heating and radiant heat transfer heating.

6. The lithium nitride manufacturing device according to claim 1, wherein the atmosphere cooling unit includes a heat exchanger.

7. A method of manufacturing lithium nitride, the method comprising:
   a step (A) of disposing a lithium member in the reaction tank of the lithium nitride manufacturing device according to claim 1; and
   a step (B) of nitriding the lithium member by making the inside of the reaction tank to be in a nitrogen atmosphere and heating the lithium member using the heating unit while controlling a dew point and a temperature in the reaction tank using the atmosphere control unit and the atmosphere cooling unit.

8. The method of manufacturing lithium nitride according to claim 7, wherein the dew point in the reaction tank in the step (B) is lower than 0° C.

9. The method of manufacturing lithium nitride according to claim 7, further comprising:
   a step (C) of embedding inorganic particles in the lithium member before the step (B).

10. The method of manufacturing lithium nitride according to claim 9, wherein the inorganic particles are lithium nitride powder.

11. The method of manufacturing lithium nitride according to claim 9, wherein when a total amount of the inorganic particles and the lithium member is represented by 100 mass %,
   an amount of the inorganic particles embedded is 0.1 mass % or more and 10 mass % or less.

12. The method of manufacturing lithium nitride according to claim 7, wherein a heating temperature of the heating unit in the step (B) is 30° C. or higher.

13. The method of manufacturing lithium nitride according to claim 7, wherein an atmosphere temperature in the reaction tank in the step (B) is 20° C. or higher and 40° C. or lower.

14. The method of manufacturing lithium nitride according to claim 7, wherein a real temperature of the lithium member in the step (B) is 30° C. or higher.

15. The method of manufacturing lithium nitride according to claim 7, wherein the lithium member is metallic lithium foil.

16. The method of manufacturing lithium nitride according to claim 15, wherein a thickness of the metallic lithium foil is 3 mm or less.

17. The method of manufacturing lithium nitride according to claim 7, further comprising: a step (D) of crushing the nitrided lithium member into powder after the step (B).

18. The lithium nitride manufacturing device according to claim 4, which is configured to nitride the lithium member by heating the lithium member using the heating unit while controlling a dew point and a temperature in the reaction tank using the atmosphere control unit and the atmosphere cooling unit.

19. The lithium nitride manufacturing device according to claim 18, wherein the heating unit is disposed in the reaction tank.

* * * * *